(12) United States Patent
Omura (10) Patent No.: US 9,210,918 B2
(45) Date of Patent: Dec. 15, 2015

(54) FISHING LINE GUIDE

(71) Applicant: Fuji Kogyo Co., Ltd., Shizuoka-shi, Shizuoka-ken (JP)

(72) Inventor: Kazuhito Omura, Shizuoka (JP)

(73) Assignee: FUJI KOGYO CO., LTD., Shizuoka-Ken (JP)

( * ) Notice: Subject to any disclaimer, the term of this patent is extended or adjusted under 35 U.S.C. 154(b) by 101 days.

(21) Appl. No.: 13/752,825

(22) Filed: Jan. 29, 2013

(65) Prior Publication Data

US 2013/0205640 A1      Aug. 15, 2013

Related U.S. Application Data

(62) Division of application No. 12/453,682, filed on May 19, 2009, now Pat. No. 8,365,458.

(30) Foreign Application Priority Data

May 19, 2008 (JP) .................................. 2008-130492

(51) Int. Cl.
    *A01K 87/04* (2006.01)
(52) U.S. Cl.
    CPC ...................................... *A01K 87/04* (2013.01)
(58) Field of Classification Search
    CPC ....................................................... A01K 87/04
    USPC ............................................................. 43/24
    See application file for complete search history.

(56) References Cited

U.S. PATENT DOCUMENTS

| | | | | |
|---|---|---|---|---|
| 1,937,972 A | * | 12/1933 | Madden | 43/24 |
| 1,984,349 A | * | 12/1934 | Gurrieri et al. | 43/24 |
| D108,720 S | * | 3/1938 | Morgan | 43/24 |
| 2,619,714 A | * | 12/1952 | Dornaus | 43/24 |
| 2,650,447 A | * | 9/1953 | Johnson | 43/24 |
| 2,775,054 A | * | 12/1956 | Shinbane | 43/24 |
| 2,872,751 A | * | 2/1959 | Mayfield | 43/24 |
| 3,063,186 A | * | 11/1962 | Ward, IV | 43/24 |
| 3,171,229 A | * | 3/1965 | Shobert | 43/24 |
| 3,690,027 A | * | 9/1972 | Ohmura | 43/24 |
| 4,141,132 A | * | 2/1979 | Ohmura | 43/24 |
| 4,586,285 A | * | 5/1986 | Kim | 43/24 |
| 5,090,150 A | * | 2/1992 | Pirazzini | 43/24 |
| D335,328 S | * | 5/1993 | Ohmura | D22/143 |
| D349,749 S | * | 8/1994 | Yamamoto et al. | D22/143 |
| 5,361,529 A | * | 11/1994 | Lindler | 43/24 |
| 5,577,338 A | * | 11/1996 | Matsumoto et al. | 43/24 |
| D395,695 S | * | 6/1998 | Ohmura | D22/143 |
| 5,870,848 A | * | 2/1999 | Ohmura | 43/24 |
| 5,941,013 A | * | 8/1999 | Ohmura | 43/24 |
| 6,016,621 A | * | 1/2000 | Maeda | 43/24 |

(Continued)

FOREIGN PATENT DOCUMENTS

| | | | | |
|---|---|---|---|---|
| CN | 1875702 A | 11/2009 | | |
| EP | 2236026 A1 | * 10/2010 | ............ | A01K 87/04 |

(Continued)

*Primary Examiner* — Darren W Ark
(74) *Attorney, Agent, or Firm* — Bacon & Thomas, PLLC (57) ABSTRACT

A fishing line guide having a line guide ring inclined to a tip side, and an angle of junction between the line guide ring and right and left side support legs made smaller at a butt side than at a tip side, and a hook concave portion, where the right and left support legs have outer contour surfaces and the right and left support legs are curved outwardly and continuously with respect to right and left tangential lines of the line guide ring.

8 Claims, 9 Drawing Sheets

(56) References Cited

U.S. PATENT DOCUMENTS

| | | | |
|---|---|---|---|
| 6,067,742 A * | 5/2000 | Ohmura | 43/24 |
| 6,067,743 A * | 5/2000 | Ohmura | 43/24 |
| 6,378,240 B1 * | 4/2002 | Ohmura | 43/24 |
| 6,430,865 B1 * | 8/2002 | Burton, Sr. | 43/24 |
| D482,427 S * | 11/2003 | Park | D22/143 |
| D494,249 S * | 8/2004 | Grayson | D22/143 |
| D627,032 S * | 11/2010 | Gimbert | D22/143 |
| D631,127 S * | 1/2011 | Akiba | D22/143 |
| D635,217 S * | 3/2011 | Akiba | D22/143 |
| 7,913,442 B2 * | 3/2011 | Roth | 43/24 |
| D641,063 S * | 7/2011 | Akiba | D22/143 |
| D644,709 S * | 9/2011 | Lin | D22/143 |
| D715,397 S * | 10/2014 | Lin | D22/143 |
| 2005/0172535 A1 * | 8/2005 | Lee | 43/24 |
| 2006/0032107 A1 * | 2/2006 | Yu | 43/24 |
| 2006/0283073 A1 * | 12/2006 | Omura | 43/24 |
| 2010/0263257 A1 * | 10/2010 | Akiba et al. | 43/24 |

FOREIGN PATENT DOCUMENTS

| | | | | | |
|---|---|---|---|---|---|
| JP | 03067534 A | * | 3/1991 | | A01K 87/04 |
| JP | 09298991 A | * | 11/1997 | | A01K 87/04 |
| JP | 10004832 A | * | 1/1998 | | A01K 87/04 |
| JP | 10136841 A | * | 5/1998 | | A01K 87/04 |
| JP | 10309153 A | * | 11/1998 | | A01K 87/04 |
| JP | 11239434 A | * | 9/1999 | | A01K 87/04 |
| JP | 2000253778 A1 | | 9/2000 | | |
| JP | 2001161225 A | * | 6/2001 | | A01K 87/04 |
| JP | 2001299158 A | * | 10/2001 | | A01K 87/04 |
| JP | 2002101789 A | * | 4/2002 | | A01K 87/04 |
| JP | 2002112674 A | * | 4/2002 | | A01K 87/04 |
| JP | 2002171872 A | * | 6/2002 | | A01K 87/04 |
| JP | 2003284456 A | * | 10/2003 | | A01K 87/04 |
| JP | 2004024079 A | * | 1/2004 | | A01K 87/04 |
| JP | 2004024080 A | * | 1/2004 | | A01K 87/04 |
| JP | 2004089055 A | * | 3/2004 | | A01K 87/04 |
| JP | 2005143460 A | * | 6/2005 | | A01K 87/04 |
| JP | 2006204134 A | * | 8/2006 | | A01K 87/04 |
| JP | 2007006767 A | * | 1/2007 | | A01K 87/04 |
| JP | 2008125463 A | * | 6/2008 | | A01K 87/04 |
| JP | 2009273443 A | * | 11/2009 | | A01K 87/04 |
| JP | 2010115149 A | * | 5/2010 | | A01K 87/04 |
| JP | 2010233473 A | * | 10/2010 | | A01K 87/04 |
| JP | 2010233519 A | * | 10/2010 | | A01K 87/04 |
| JP | 2010233529 A | * | 10/2010 | | A01K 87/04 |
| JP | 2011004651 A | * | 1/2011 | | A01K 87/04 |
| JP | 2011092012 A | * | 5/2011 | | A01K 87/04 |
| JP | 2011092013 A | * | 5/2011 | | A01K 87/04 |
| JP | 2011092074 A | * | 5/2011 | | A01K 87/04 |

* cited by examiner

FISHING LINE GUIDE

BACKGROUND OF THE INVENTION

1. Field of the Invention

The present invention relates to an outside through fishing line guide.

2. Description of the Conventional Art

In recent years, while a Super braided line (an ultra high molecular weight polyethylene multi filament line) is sold as a fishing line, this Super braided line has an extremely higher strength than a conventional nylon line or fluorocarbon line, and becomes a mainstream of the fishing line. However, since it is a so-called Super braided line as is different from a conventional monofilament line, it has no tension and is extremely flexible. Accordingly, a tangle tends to be generated in comparison with the conventional fishing line, and any tangle prevention measure has been demanded.

Accordingly, the tangle is generated in various fields of the fishing. In addition to a typical case that the fishing line passing through a line guide ring of a fishing line guide goes around a rear side of the line guide ring due to "line slack" or the like, and is tightened around the fishing line guide so as to generate a tangle, there is a case that the fishing line before passing through the line guide ring is tightened around the fishing line guide so as to generate the tangle, just after casting.

With regard to the latter, a description will be given in detail by exemplifying a fishing rod to which an upright type fishing line guide 101 shown in FIG. 13 is installed. In a moment of casting, as shown in FIG. 13(1), a straight fishing line which is not wound around a spool of a reel passes through a line guide ring 103 without any problem, and a spiral fishing line released from the spool so as to be drawn out is subsequently choked by the line guide ring 103 so as to pass approximately straightly, as shown in FIG. 13(2). However, if the choking is not smoothly carried out, a speed of the passing fishing line slows down, and the spiral fishing line starts staying at a rear side of the line guide ring 103. Further, if it stays beyond a certain degree of amount, the spiral fishing line next overflows from one side of the line guide ring 103 so as to come out forward. Under such the state, if the overflowing spiral fishing line is guided to the other side by being exposed to a suitable wind (a wind from a left side in this case) as shown in FIG. 13(4), it gets into a portion between the fishing line after passing and the fishing line guide 101, and there is further the case that it covers the line guide ring 103, as shown in FIG. 13(5). Since the speed of the trailing fishing line slows down immediately, the fishing line covering as mentioned above is pulled back to a butt side and goes forward to a tip side while passing through the line guide ring 103. However, if a covering degree is small, it is disentwined while slipping along an outer periphery of the line guide ring 103 at a time of being pulled back. However, as shown in FIG. 13(6), if the covering degree is large, it is tightened around the line guide ring 103 so as to generate the tangle.

In order to dissolve the tangle, there has been proposed a structure in which a pair of side support legs of the fishing line guide are inclined to the tip side. There is considered that if a rodbody is properly swung in such a manner as to cast a device, the fishing line enwinding around the fishing line guide smoothly slides up on the inclined surface and finally comes off upward from the tip side, so that the tangle is dissolved.

Reference is made to Japanese Unexamined Patent Publication No. 2000-253778.

SUMMARY OF THE INVENTION

However, in the case of a so-called single foot guide, the tangle tends to be dissolved in accordance that a degree of inclination of the side support leg to the tip side becomes larger. On the other hand, since a distance from a root of the side support leg to a top portion of the line guide ring becomes longer, a bending moment applied to the root of the support leg becomes large, and a deformation of the fishing line guide tends to be generated.

Further, since the fishing line guide is generally formed by a material having a high rigidity (for example, a stainless steel), the rod body portion to which the fishing line guide is attached becomes rigid. Accordingly, if a front support leg is provided for avoiding the deformation of the fishing line guide, the rigidity between the front and rear attaching portions becomes further higher, a smooth bend of a whole of the rod body is hard to be obtained in accordance with an enlargement of the degree of inclination of the side support leg to the tip side. Further, a weight is increased, and it gives a feeling of heaviness when handling the rod.

Accordingly, in order to achieve the problem mentioned above, an object of the present invention is to provide a fishing line guide having a novel shape, which can achieve the same tangle preventing effect as the conventional one even though a degree of inclination of a side support leg to a tip side is made smaller than the conventional one.

Means for Solving the Problem

In order to achieve the object mentioned above, in accordance with a first aspect of the present invention, there is provided a fishing line guide comprising:

a line guide ring;

a pair of right and left side support legs extending downward from both right and left sides of said line guide ring; and an attaching portion continuously provided at lower ends of said side support legs and attached to a rod body, wherein said line guide ring is inclined to a tip side, and an angle of junction between said line guide ring and said side support legs is made smaller at a butt side than at a tip side, in a side view, and a hook concave portion on which a fishing line is caught so as to be turned back is not formed between said line guide ring and said side support legs, in a front view.

In accordance with a second aspect of the present invention, there is provided the fishing line guide as recited in the first aspect, wherein the line guide ring is inclined at 10 degrees or more to the tip side in the side view.

In accordance with a third aspect of the present invention, there is provided the fishing line guide as recited in the first or second aspect, wherein on the basis of a region surrounded by a right tangential line in which a start point is set to a boundary point between a left attaching portion and a left support leg, and an end point is set to a contact point on a right outer periphery of a contour line of the line guide ring; and a left tangential line in which a start point is set to a boundary point between a right attaching portion and a right support leg, and an end point is set to a contact point on a left outer periphery of the contour line of said line guide ring, in the front view, an outer contour line of said left support leg is positioned on a left contour line of said region or outside thereof, and an outer contour line of said right support leg is positioned on a right contour line of said region or outside thereof.

In accordance with a fourth aspect of the present invention, there is provided the fishing line guide as recited in the first or second aspect, wherein an angle of junction between the line guide ring and the side support leg is equal to or less than 175 degrees at the butt side, in the side view.

In accordance with a fifth aspect of the present invention, there is provided the fishing line guide as recited in the first or second aspect, wherein an angle of inclination of said line guide ring to the tip side is equal to or less than 25 degrees, in the side view.

In accordance with a sixth aspect of the present invention, there is provided the fishing line guide as recited in the first or second aspect, wherein the side support legs are formed by a frame which is bent in such a manner as to bulge to the butt side.

In accordance with a seventh aspect of the present invention, there is provided the fishing line guide as recited in the third aspect, wherein an angle of junction between the line guide ring and the side support leg is equal to or less than 175 degrees at the butt side, in the side view.

In accordance with an eighth aspect of the present invention, there is provided the fishing line guide as recited in the third aspect, wherein an angle of inclination of said line guide ring to the tip side is equal to or less than 25 degrees, in the side view.

In accordance with a ninth aspect of the present invention, there is provided the fishing line guide as recited in the third aspect, wherein the side support legs are formed by a frame which is bent in such a manner as to bulge to the butt side.

In the fishing line guide in accordance with the present invention, the degree of inclination of the side support leg to the tip side is made smaller than the conventional one, in spite of the tangle preventing type. Accordingly, it is possible to dissolve the tangle without deteriorating the behavior and use feeling of the fishing rod as well as its strength can be maintained.

BRIEF EXPLANATION OF DRAWINGS

FIGS. 2(1) and 2(2) are side views of a fishing line guide in FIG. 1;

FIGS. 4(1) to 4(3) are explanatory views of a tangle dissolving mechanism of the fishing line guide in FIG. 1;

FIGS. 5(4) to 5(6) are explanatory views of the tangle dissolving mechanism of the fishing line guide in FIG. 1;

FIGS. 7(1) and 7(2) are explanatory views of a tangle problem of a comparative product (fishing line guide);

FIGS. 8(1) and 8(2) are explanatory views of a tangle problem of a comparative product (fishing line guide);

FIGS. 10(1) and 10(2) are a side view and a front view of a fishing line guide in accordance with a third embodiment of the present invention;

FIGS. 11(1) and 11(2) are a side view and a front view of a fishing line guide in accordance with a fourth embodiment of the present invention;

FIGS. 12(1) and 12(2) are perspective views of fishing line guides in accordance with fifth and sixth embodiments of the present invention; and FIGS. 13(1) to 13(6) are explanatory view of a tangle generating mechanism.

DETAILED DESCRIPTION OF PREFERRED EMBODIMENT

A description will be given of a fishing line guide 1 in accordance with a first embodiment of the present invention with reference to FIGS. 1 to 13(6). First of all, a description will be schematically given of a whole shape of a fishing line guide 1.

Figure 1:
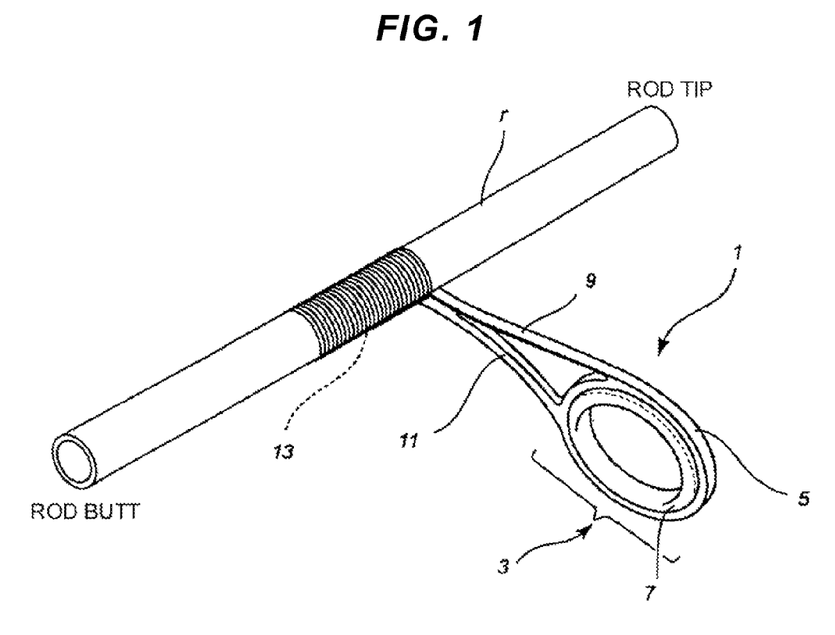
FIG. 1 is a perspective view of a fishing line guide in accordance with a first embodiment of the present invention.
Figure 2:
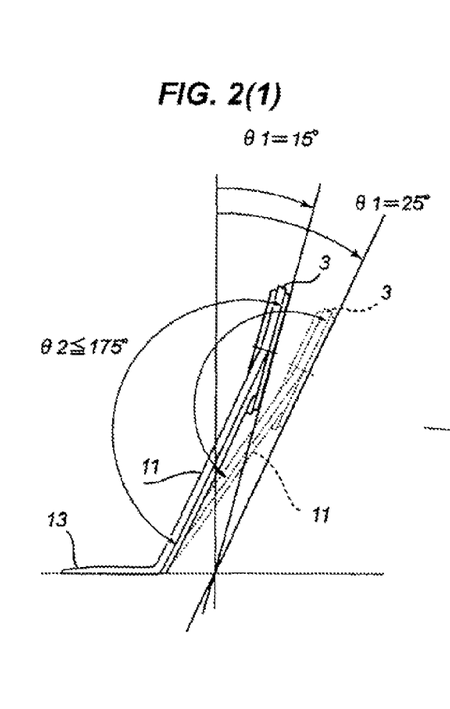

As shown in FIG. 1, the fishing line guide 1 is formed integrally to have a frame shape from one plane metal plate material. Firstly, it is stamped out to have a predetermined frame shape in accordance with a press work, is further formed in a predetermined three-dimensional shape by applying a bending work, and is provided with a line guide ring 3, a pair of side support legs 9 and 11, and an attaching portion 13.

The line guide ring 3 is constructed by a hold ring 5, and a guide ring 7 inward fitted thereto. An inner periphery of the hold ring 5 is formed in an approximately complete round shape, and a complete round guide ring 7 is inward fitted to an inner peripheral surface thereof. The guide ring 7 is formed by a hard material which is excellent in an abrasion resistance such as a ceramic or the like.

A pair of side support legs 9 and 11 are formed in symmetrical shapes because a balance is taken into consideration. The side support legs 9 and 11 extend out toward a rod body r respectively from both left and right sides at the butt side of the hold ring 5, confluent at a position having a suitable height, and are connected to an attaching portion 13 in their lower ends.

Although an illustration will be omitted, the attaching portion 13 is formed in a tongue shape which is tapered to a rear side, and comes into contact with an outer surface of the rod body r in a state of being oriented approximately in parallel to a rod axis. The attaching portion 13 is attached to the rod body r by a fixing line being wound.

Next, a description will be given in detail of a shape of each of portions of the fishing line guide 1 and a positional relation between the portions.

First, a description will be given of a shape in a side view on the basis of the side view figure (FIGS. 2(1) and 2(2)).

For convenience of explanation, the fishing line guide 1 is arranged at an upper side of the rod body r.

(Side View Condition 1)

The line guide ring 3 is inclined to a tip side.

In the case of casting a device by swinging the rod body r provided with the fishing line guide 1 having the line guide ring 3 inclined to a direction in which a fishing line S is pulled, the fishing line S is pulled by a force T toward the tip side as shown by an arrow even if a tangle is generated. Accordingly, there is generated a pull-up component force T1 in an upward direction is generated with respect to the line guide ring 3. In the present invention, a sliding motion of the fishing line S caused by the pull-up component force T1 is utilized for dissolving the tangle.

An actual sliding motion of the fishing line S is affected by a surface nature of the line guide ring 3, however, it is confirmed that, in the case that the fishing line guide 1 is manufactured by using a raw material and a working technique of a currently available fishing line guide, a necessary magnitude of pull-up component force T1 can be obtained when the guide ring 7 is inclined at 10 degrees (a) or more to the tip side.

However, since the spool exists comparatively above a rod surface in a general spinning reel, the spool is inclined at about 4 to 5 degrees with respect to the rod surface, for making the fishing line S close to the rod surface. Accordingly, the fishing line S just after being pulled out of the spool is inclined at about 4 to 5 degrees toward the tip side. Therefore, in the case that the fishing line guide 1 is installed to the rod body r at a portion which is close to the spinning reel, it is preferable that an angle of inclination (θ1) of the line guide ring 3 is set to be equal to or more than 15 degrees, while taking into consideration the angle of inclination of the fishing line S.

It is preferable that the angle of inclination (θ1) of the line guide ring 3 is set to be equal to or less than 25 degrees and the angle of inclination (θ1) of the line guide ring 3 in this fishing line guide is set to be equal to or less than 25 degrees.

At a time of seeing either the butt side or the tip side in a direction of the rod axis, if the line guide ring 3 is inclined, a vertical diameter of a complete round shape of an insertion hole of the inward fitted guide ring 7 looks to be contracted as if it becomes an oval shape in its appearance, and an insertion range of the fishing line S is narrowed. Accordingly, a friction resistance of the fishing line S becomes high. Therefore, it is possible to design a guide which prevents a significant emergence of the problem of the friction resistance mentioned above, by setting the angle of inclination (θ1) of the line guide ring 3 to which the guide ring 7 is inward fitted to be equal to or less than 25 degree, even if the complete round guide ring 7 which can be easily manufactured is used.

Further, if the angle of inclination (θ1) of the line guide ring 3 exceeds 25 degrees, there comes a possibility that the problem of the deformation of the fishing line guide 1 emerges in relation to a set condition concerning an angle of junction between the line guide ring 3 and the side support legs 9 and 11, which will be mentioned in detail later. Accordingly, it is preferable that the angle of inclination (θ1) of the line guide ring 3 is set to be equal to or less than 25 degree.

(Side View Condition 2)

An angle of junction between the line guide ring 3 and the side support legs 9 and 11 is set such as to be smaller at the butt side than at the tip side. In particular, an angle of junction (θ2) at the butt side is set to be less than 180 degree. It is preferable that it is set to be equal to or less than 175 degree from an upper limit direction, and is set to be equal to or less than 175 degree in this fishing line guide 1.

Accordingly, even in the case that the fishing line S particularly before passing through the guide ring 7 is tightened around the fishing line guide 1 due to the cause as mentioned above so as to generate the tangle, a turn back position A in FIG. 4 moves well and the tangle can be dissolved as mentioned later in detail. If the angle of junction (θ2) at the butt side is set to be equal to or less than 175 degree, the tangle can be more securely dissolved and such is preferable.

On the other hand, in the case that the shape of the side support legs are a linear shape, it is preferable that the angle of junction (θ2) at the butt side is set to be equal to or more than 150 degree. If the angle becomes equal to or less than 150 degree, the side support legs 9 and 11 incline too much, and there is a possibility that the problem of the deformation of the fishing line guide 1 significantly emerge.

However, in the case that the side support legs are bulged to the butt side as shown in FIG. 11, there is no such problem.

Figure 3:
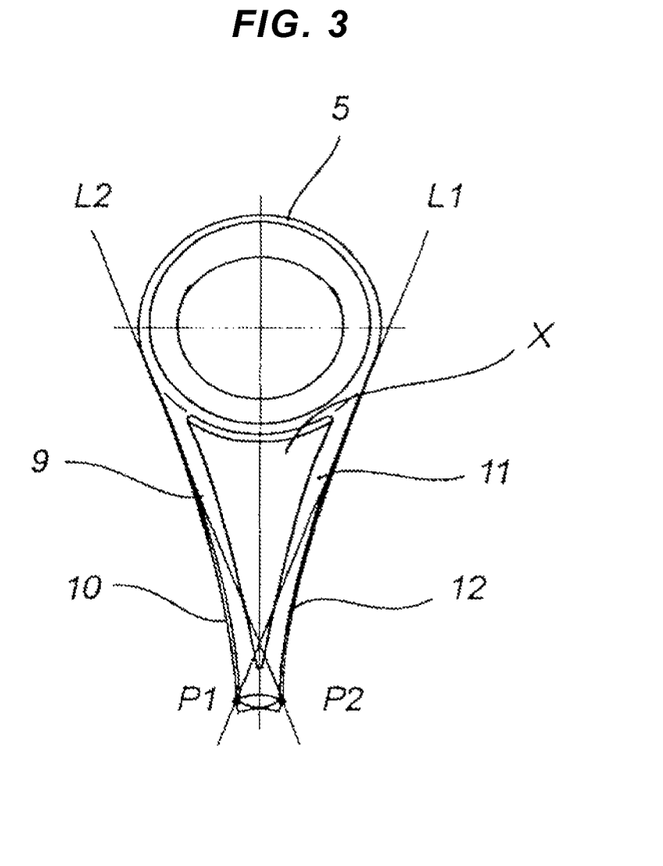
FIG. 3 is a front view of the fishing line guide in FIG. 1.
Figure 4:
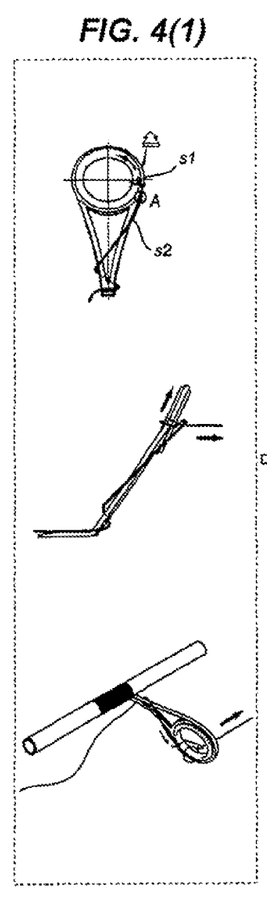
Figure 5:
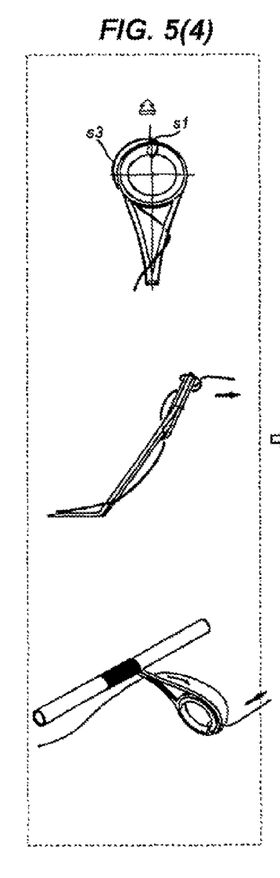

Next, a description will be given of a front view shape (as seeing from the butt side), on the basis of a front view figure (FIG. 3).

(Front View Condition)

A hook concave portion on which the fishing line S is caught so as to be turn back is not formed between the hold ring 5 and the side support legs 9 and 11.

Describing a specific shape, there are drawn a right tangential line L1, in which a start point is set to a boundary point P1 on an outer contour line between a left side of the attaching portion 13 and the left support leg 9, and an end point is set to a contact point on an outer periphery of a right contour line of the hold ring 5, and a left tangential line L2 in which a start point is set to a boundary point P2 on an outer contour line between a right side of the attaching portion 13 and the right support leg 11, and an end point is set to a contact point on an outer periphery of a left contour line of the hold ring 5. Further, there is assumed a gray region X surrounded laterally by the right tangential line L1 and the left tangential line L2. A left contour line of the gray region X comes to the left tangential line L2 at an upper side of an intersecting point between the right tangential line L1 and the left tangential line L2, and comes to the right tangential line L1 at a lower side of the intersecting point. In the same manner, a right contour line of the gray region X comes to the right tangential line L1 at the upper side of the intersecting point between the right tangential line L1 and the left tangential line L2, and comes to the left tangential line L2 at the lower side of the intersecting point.

An outer contour line 10 of the left support leg 9 is positioned on the left contour line of the gray region X or outside thereof, and an outer contour line 12 of the right support leg 11 is positioned on the right contour line of the gray region X or outside thereof.

Accordingly, even in the case that the fishing line S particularly before passing through the guide ring 7 is tightened around the fishing line guide 1 due to the cause mentioned above so as to generate the tangle, the turn back position A in FIG. 4 moves well so as to dissolve the tangle, as mentioned later in detail.

In this case, as for the tangle mentioned above, while an enwinding portion s1 around the line guide ring 3 comes to any of right and left sides in accordance with a winding direction of the fishing line around the reel spool, a set condition concerning the gray region X relates to a position of the enwinding portion s1. Accordingly, it is sufficient that a side in which the position of the enwinding portion s1 exists is positioned on any contour line of the gray region X or outside thereof, however, since the winding direction of the spinning reel is not fixed, it is set in such a manner as to satisfy the condition of "and".

Next, a description will be given of a tangle dissolving mechanism in the case that the fishing line S before passing through the guide ring 7 is tightened around the fishing line guide 1 due to the cause mentioned above so as to generate the tangle, with reference to FIGS. 4(1) to 4(3) and 5(4) to 5(6).

For convenience of visual understanding, there are drawn the fishing line guide 1 in a front view, a side view and a perspective view from the butt side, in each of stages.

If the rod body r is swung and the device is cast, the fishing line S is pulled toward the tip side. In other words, a pulling force (a tension) T is applied in a direction of an arrow. Accordingly, in the fishing line S tightened to the fishing line guide 1 so as to generate the tangle, the enwinding portion s1 enwinding around the line guide ring 3 is exposed to the pull-up component force T1, and the fishing line S is pulled out to the tip side as shown by an arrow in FIG. 4(1), whereby the enwinding portion s1 is pulled up while sliding on the hold ring 5 toward a top portion of the line guide ring 3.

The enwinding portion s1 has a trailing portion s2, which is turned back by the hold ring 5 or the right support leg 11 so as to be bridged over a butt side surface of the fishing line guide 1 and be turned back by the left support leg 9, before it. However, the trailing portion s2 is pulled up in accordance with a movement of the enwinding portion s1 as shown by an arrow in FIG. 4(2). At this time, since the pulling force T is applied, the trailing portion s2 tends to come back to the tip side again through a shortest distance. Accordingly, the right turn back position A (illustrated by surrounding with a circle ○) closer to the enwinding portion s1 always slides so as to be pulled up while keeping a position near the enwinding portion s1.

As shown by an arrow in FIG. 4(3), if the enwinding portion s1 reaches the top portion of the line guide ring 3 or the portion near the same, the turn back position A of the trailing portion s2 climbs over the enwinding portion s1 so as to head for the left side. Further, as shown in FIG. 5(4), the trailing portion s2 gets out of the portion between the top portion of the hold ring 5 and the left side portion toward the tip side. Next, at this time, as shown by an arrow in FIG. 5(5), an ejection portion s3 is pulled out to the butt side and then passes through an insertion hole, and finally gets out of the portion between the top portion of the hold ring 5 and the right side portion thereof to the butt side as shown in FIG. 5(6), and passes through the insertion hole together with the enwinding portion s1 so as to move forward.

The tangle is dissolved in the manner mentioned above.

Figure 6:
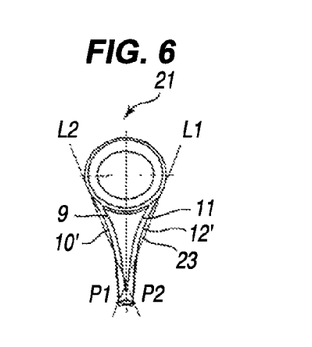
FIGS. 6, 6(1) and 6(2) are explanatory views of a tangle problem of a comparative product (fishing line guide)
Figure 7:
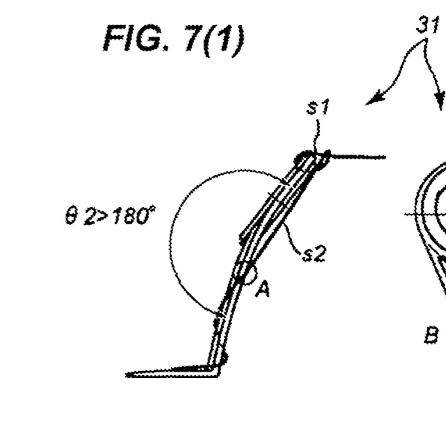
Figure 8:
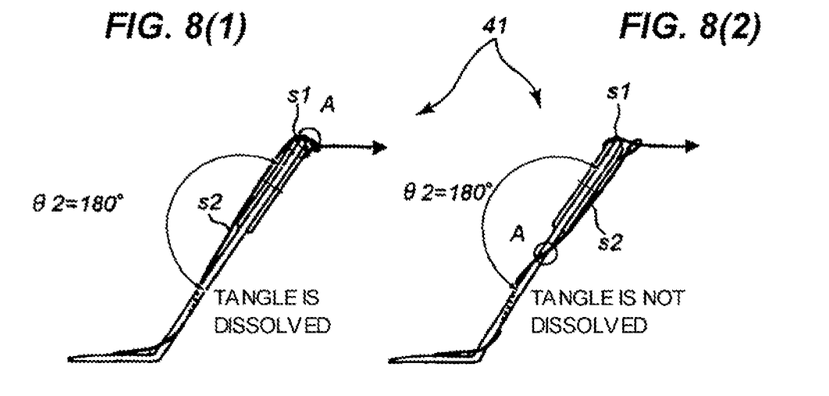

On the contrary, in the case that a hook concave portion 23 on which the fishing line S is caught so as to be turned back is formed between the line guide ring 3 and the right support leg 11, such as the fishing line guide 21 in FIG. 6, specifically in the case that an outer contour line 12' of the right support leg 11 is positioned inside the right contour line of the gray region X, the following state is generated.

In the case of a fishing line guide 21 set as mentioned above, the fishing line changes as shown in FIG. 6(1) to FIG. 6(2), while the fishing line S changes from FIG. 4(1) to FIG. 4(2), in the case of the fishing line guide 1. In other words, the trailing portion s2 is pulled up in accordance with the sliding motion of the enwinding portion s1, however, the turn back position A thereof is caught on the hook concave portion 23 so as to be held there, and is not pulled up together with the enwinding portion s1. Accordingly, the tangle is not dissolved.

Further, in the case that the angle of junction between the line guide ring 3 and the right support leg 11 is made larger at the butt side than at the tip side, such as the fishing line guide 31 in FIGS. 7(1) and 7(2), since the trailing portion s2 tends to go back again to the tip side through the shortest distance, the right turn back position A tends to keep a position near the left turn back position B. Accordingly, the right turn back position A is not pulled up together with the enwinding portion s1, and the tangle is not dissolved.

If the angle of junction between the line guide ring 3 and the right support leg 11 is identical at the tip side and at the butt side, such as the fishing line guide 41 in FIGS. 8(1) and 8(2), there are cases that the phenomenon as mentioned above is generated and are not generated, and it is impossible to sufficiently achieve the object of preventing the tangle.

As comparatively described above, the fishing line guide 1 in accordance with the present embodiment can smoothly dissolve a complicated tangle generated before the fishing line S passes through the guide ring 7.

Further, since the fishing line S going around the butt side is pulled up by utilizing the pull-up component force T1 mentioned above even in case of the tangle caused by a so-called "line slack", the tangle can be smoothly dissolved.

Figure 9:
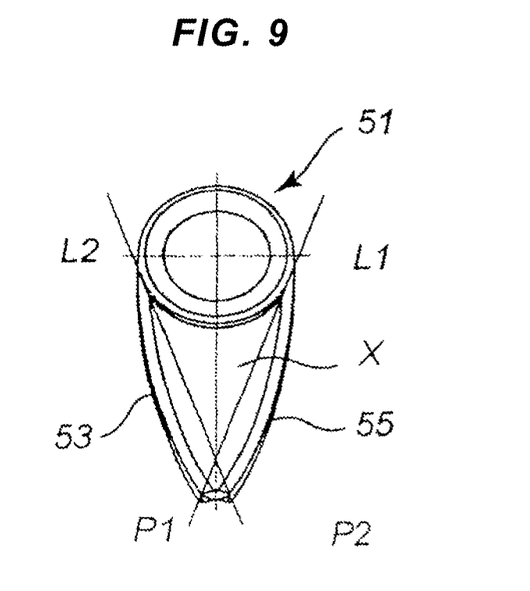
FIG. 9 is a front view of a fishing line guide in accordance with a second embodiment of the present invention.
Figure 10:
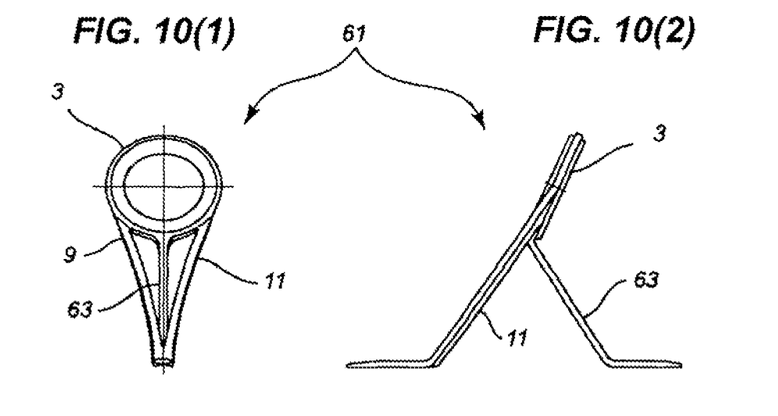
Figure 11:
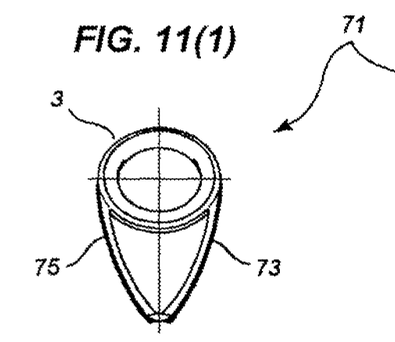
Figure 12:
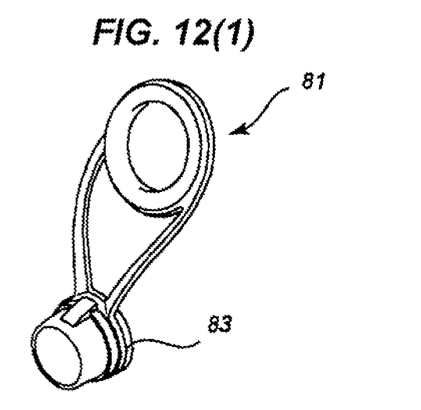
Figure 13:
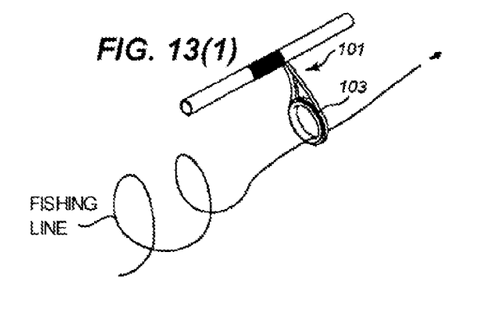

A description will be given of a fishing line guide 51 in accordance with a second embodiment with reference to a front view in FIG. 9. This embodiment is different from the fishing line guide 1 in accordance with the first embodiment in a point that side support legs 53 and 55 are formed by a further outward bulging frame.

Since the fishing line S is more smoothly pulled up on the basis of the bulge as mentioned above, the tangle can be further quickly dissolved.

A description will be given of a fishing line guide 61 in accordance with a third embodiment with reference to a side view and a front view in FIGS. 10(1) and 10(2). This embodiment is different from the fishing line guide 1 in accordance with the first embodiment in a point that a front support leg (a tip side support leg) 63 is provided. The fishing line guide 61 belongs to a so-called double foot guide.

An existence of the front support leg 63 does not substantially affect a moving locus of the fishing line S at a time of tangling. Accordingly, the fishing line guide 61 can obtain the same tangle dissolving effect as the fishing line guide 1. Further, since the front support leg 63 is provided, the fishing line guide 61 is hard to be deformed. Further, since the side support legs 9 and 11 rise up more than the conventional inclined type fishing line guide, the attaching length to the rod body r can be held shorter than the conventional product even if the front support leg 63 is provided, and a flexibility of a whole of the rod body is not significantly deteriorated.

A description will be given of a fishing line guide 71 in accordance with a fourth embodiment with reference to a side view and a front view in FIGS. 11(1) and 11(2). This embodiment is different from the guide 51 in accordance with the second embodiment mainly in a point that frames of side support legs 73 and 75 are bent in such a manner as to bulge to the butt side.

On the basis of the setting as mentioned above, even if the angle of junction with the line guide ring at the butt side becomes equal to or less than 150 degree, it is possible to make a longitudinal distance d between end portions of the side support legs 73 and 75 short, and the fishing line guide 71 is hard to be deformed.

A description will be given of fishing line guides 81 and 91 in accordance with fifth and sixth embodiments with reference to perspective views in FIGS. 12(1) and 12(2). In these fishing line guides 81 and 91, attaching portions 83 and 93 are formed in an annular shape (a so-called slip-on type). Even in the attaching portions 83 and 93 as mentioned above, it is possible to obtain the same effect as the fishing line guide 1 in accordance with the first embodiment, as far as it satisfies the shape conditions in the side view and the front view mentioned above.

Although the description is given as above of the embodiments in accordance with the present invention, the concrete structure of the present invention is not limited to the embodiment mentioned above, but the present invention includes a design change within the scope of the present invention.

For example, the line guide ring of the fishing line is structured such that the hard guide ring made as an independent member is inward fitted to the inner peripheral surface of the hold ring, however, may be constructed by a single member as far as desired strength, hardness and abrasion resistance can be secured.

The present invention is useful in the case of a so-called high foot type, however, is not limited to this.

In any case, it is possible to optionally combine conventional or future shapes, raw materials and manufacturing methods, as for those except the claimed matters.

If the fishing rod provided with the fishing line guide in accordance with the present invention is used, the tangle can be prevented even when using the Super braided line, the strength can be secured, and the behavior and the use feeling of the fishing rod are not deteriorated.

Accordingly, the present invention is a long awaited article for an angler.

What is claimed is:

1. A fishing line guide comprising:
   a line guide ring having a round shape;
   a pair of right and left side support legs extending downward from right and left sides of said line guide ring; and
   an attaching portion provided at lower portions of said pair of right and left side support legs and attachable to a rod body,
   wherein an outer peripheral surface of the line guide ring is disposed away from the rod body when attached to the rod body;
   wherein said right and left support legs have outer contour surfaces, and said right and left support legs are curved outwardly and continuously with respect to right and left tangential lines of the line guide ring so that a fishing line is not catchable on the right and left support legs to turn back the fishing line, in a front view,
   wherein the right tangential line is defined by a straight line passing through a boundary point between a left side of the attaching portion and the left support leg and tangential to a right outer surface of the line guide ring, and the left tangential line is defined by a straight line passing through a boundary point between a right side of the attaching portion and the right support leg and tangential to a left outer surface of the line guide ring,
   wherein said entire extent of said right and left support legs are curved outwardly to form an outwardly bulging frame from the right side and left side of the attaching portion to the right and left outer surfaces of the line guide ring, respectively,
   wherein said line guide ring only has said right and left support legs extending from an entirety of the outer peripheral surface of said line guide ring toward the rod body when attached to the rod body, and the outer contour surfaces of the right and left support legs are located outside a region surrounded by the right and left tangential lines, respectively, so that even when the fishing line before passing through the line guide ring is tightened around the fishing line guide, a trailing portion of the fishing line following after an enwinding portion of the fishing line on the guide ring is pulled up smoothly in accordance with a movement of the enwinding portion to dissolve tangling of the fishing line around the fishing line guide, and
   wherein said line guide ring is inclined to a tip side, and an angle of junction between said line guide ring and said side support legs is made smaller at a butt side than at a tip side, in a side view.

2. The fishing line guide as claimed in claim 1, wherein the line guide ring is inclined at 10 degrees or more to the tip side in the side view.

3. The fishing line guide as claimed in claim 2, wherein the angle of junction between the line guide ring and the right and left side support legs is equal to or less than 175 degrees at the butt side, in the side view.

4. The fishing ling guide as claimed in claim 2, wherein the side support legs are formed by a frame which is bent in such a manner as to bulge to the butt side.

5. The fishing line guide as claimed in claim 1, wherein the angle of junction between the line guide ring and the right and left side support legs is equal to or less than 175 degrees at the butt side, in the side view.

6. The fishing line guide as claimed in claim 5, wherein the side support legs are formed by a frame which is bent in such a manner as to bulge to the butt side.

7. The fishing line guide as claimed in claim 1, wherein the side support legs are formed by a frame which is bent in such a manner as to bulge to the butt side.

8. A fishing line guide comprising:
   a line guide ring having a round shape configured in a way to dissolve tangling of fishing line;
   a pair of right and left side support legs extending downward from right and left sides of said line guide ring; and
   an attaching portion provided at lower portions of said pair of right and left side support legs and attachable to a rod body,
   wherein an outer peripheral surface of the line guide ring is disposed away from the rod body when attached to the rod body;
   wherein said right and left support legs have outer contour surfaces, and said right and left support legs are curved outwardly and continuously with respect to right and left tangential lines of the line guide ring so that a fishing line is not catchable on the right and left support legs to turn back the fishing line, in a front view,
   wherein the right tangential line is defined by a straight line passing through a boundary point between a left side of the attaching portion and the left support leg and tangential to a right outer surface of the line guide ring, and the left tangential line is defined by a straight line passing through a boundary point between a right side of the attaching portion and the right support leg and tangential to a left outer surface of the line guide ring,
   wherein said entire extent of said right and left support legs are curved outwardly to form an outwardly bulging frame from the right side and left side of the attaching portion to the right and left outer surfaces of the line guide ring, respectively,
   wherein said line guide ring only has said right and left support legs and a front support leg extending from an entirety of the outer peripheral surface of said line guide ring toward the rod body when attached to the rod body, and the outer contour surfaces of the right and left support legs are located outside a region surrounded by the right and left tangential lines, respectively, so that even when the fishing line before passing through the line guide ring is tightened around the fishing line guide, a trailing portion of the fishing line following after an enwinding portion of the fishing line on the guide ring is pulled up smoothly in accordance with a movement of the enwinding portion to dissolve tangling of the fishing line around the fishing line guide, and
   wherein said line guide ring is inclined to a tip side, and an angle of junction between said line guide ring and said side support legs is made smaller at a butt side than at a tip side, in a side view.

* * * * *